US012695533B2

(12) United States Patent
Zhang et al.

(10) Patent No.: US 12,695,533 B2
(45) Date of Patent: Jul. 28, 2026

(54) BANDWIDTH ADJUSTMENT METHOD AND APPARATUS, STORAGE MEDIUM, AND ELECTRONIC DEVICE

(71) Applicant: ZTE Corporation, Shenzhen (CN)

(72) Inventors: Yuanbin Zhang, Shenzhen (CN); Dong Wang, Shenzhen (CN); Jinyin Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 281 days.

(21) Appl. No.: 18/289,201

(22) PCT Filed: Apr. 8, 2022

(86) PCT No.: PCT/CN2022/085907
§ 371 (c)(1),
(2) Date: Nov. 1, 2023

(87) PCT Pub. No.: WO2022/247490
PCT Pub. Date: Dec. 1, 2022

(65) Prior Publication Data
US 2024/0259128 A1     Aug. 1, 2024

(30) Foreign Application Priority Data
May 28, 2021    (CN) .......................... 202110595270.1

(51) Int. Cl.
*H04J 3/16*          (2006.01)
*H04L 41/0896*       (2022.01)
*H04Q 11/00*         (2006.01)

(52) U.S. Cl.
CPC ........ *H04J 3/1652* (2013.01); *H04L 41/0896* (2013.01); *H04J 2203/0069* (2013.01); *H04Q 2011/0079* (2013.01)

(58) Field of Classification Search
CPC ............ H04J 3/1652; H04J 2203/0069; H04L 41/0896; H04Q 2011/0079
See application file for complete search history.

(56) References Cited

U.S. PATENT DOCUMENTS

2013/0195458 A1*  8/2013  Luo ..................... H04L 41/0896
                                                          398/66
2015/0104178 A1*  4/2015  Su ........................ H04J 3/1652
                                                          398/79
(Continued)

FOREIGN PATENT DOCUMENTS

CN        102195859 A      9/2011
CN        103973265 A      8/2014
(Continued)

OTHER PUBLICATIONS

Yaqin Wang, "The mechanism of Hitless bandwidth adjustment of OSU", Apr. 12, 2021, ITU Telecommunication Standardization Sector, SG15-C.2313. All Pages (Year: 2021).*
(Continued)

*Primary Examiner* — Pranesh K Barua
(74) *Attorney, Agent, or Firm* — CANTOR COLBURN LLP

(57) ABSTRACT
A bandwidth adjustment method and apparatus, a storage medium, and an electronic device are provided. The bandwidth adjustment method including: performing interaction of bandwidth adjustment signaling between nodes via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message. By configuring the indication infor-
(Continued)

| 1 | | | | 2 | | | | | | | 3 | | | | | | | 4 | | | | | | | 5 | | | | | | | 6 | | | | | | | 7 | | | | | | | 8~192 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 2 3 4 5 6 7 8 | | | | 1 2 3 4 5 6 7 8 | | | | | | | 1 2 3 4 5 6 7 8 | | | | | | | 1 2 3 4 5 6 7 8 | | | | | | | 1 2 3 4 5 6 7 8 | | | | | | | 1 2 3 4 5 6 7 8 | | | | | | | 1 2 3 4 5 6 7 8 | | | | | | | ······ |
| VER | TPN | | | FT | RES | OT | | | RES | | RES | | | Timer | | | CRC8 | | | Payload area |

Indication overhead    Bandwidth request message    Bandwidth acknowledge message mation carried in the hitless bandwidth adjustment OAM frame to instruct each node in the network to send at least one of a bandwidth adjustment request message and a bandwidth adjustment acknowledge message via the hitless bandwidth adjustment OAM frame.

18 Claims, 3 Drawing Sheets

(56)                    References Cited

U.S. PATENT DOCUMENTS

2016/0037242 A1*  2/2016  Su ..................... H04Q 11/0071
                                                    398/45
2018/0212683 A1*  7/2018  Su ........................ H04J 3/1652
2019/0288783 A1*  9/2019  Zhong ................ H04L 27/2666

FOREIGN PATENT DOCUMENTS

CN          112752173  A      5/2021
CN          114285752  A      4/2022
EP            2999170  A1 *   3/2016   ............ H04J 3/1652

OTHER PUBLICATIONS

International Search Report for corresponding application PCT/CN2022/085907 filed Apr. 8, 2022; Mail date Jun. 10, 2022.
European Search Report for corresponding application EP2281022; Reported Aug. 21, 2024.
Yaqin Wang, "The mechanism of hitless bandwidth adjustment of OSU", vol. 11/15, Mar. 27, 2021, pp. 1-9. XP044307865.

* cited by examiner

Fig. 1

Input/output device 108

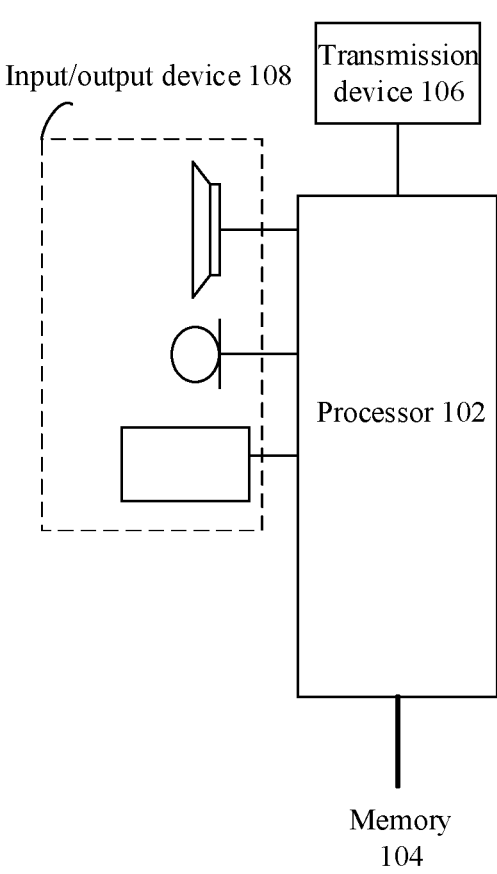

Transmission device 106

Processor 102

Memory
104

Fig. 2

Performing interaction of bandwidth adjustment signaling between nodes via a
hitless bandwidth adjustment OAM frame, wherein the hitless bandwidth
adjustment OAM frame carries indication information, the indication information
is used for indicating a type of a bandwidth adjustment message transmitted in the
hitless bandwidth adjustment OAM frame, and the type of the bandwidth
adjustment message comprises: a bandwidth adjustment request message and a
bandwidth adjustment acknowledge message

S202

| | 17 | 18 | 19 | 20 | 21 | 22 | 23 | 24 | 25...... | | 3821 | 3822 | 3823 | 3824 |
|---|---|---|---|---|---|---|---|---|---|---|---|---|---|---|
| 1 | TS1 | TS2 | TS3 | TS4 | TS1 | TS2 | TS3 | TS4 | | | TS1 | TS2 | TS3 | TS4 |
| 2 | TS1 | TS2 | TS3 | TS4 | TS1 | TS2 | TS3 | TS4 | | | TS1 | TS2 | TS3 | TS4 |
| 3 | TS1 | TS2 | TS3 | TS4 | TS1 | TS2 | TS3 | TS4 | | | TS1 | TS2 | TS3 | TS4 |
| 4 | TS1 | TS2 | TS3 | TS4 | TS1 | TS2 | TS3 | TS4 | | | TS1 | TS2 | TS3 | TS4 |

Overhead

Payload

☐ Payload block

| 1 | 2 | 3 | 4 | 5 | 6 | 7 | 8~192 |
|---|---|---|---|---|---|---|---|
| 1 2 3 4 5 6 7 8 | 1 2 3 4 5 6 7 8 | 1 2 3 4 5 6 7 8 | 1 2 3 4 5 6 7 8 | 1 2 3 4 5 6 7 8 | 1 2 3 4 5 6 7 8 | 1 2 3 4 5 6 7 8 | ...... |
| VER | TPN | FT | RES | OT | RES | RES | Timer | CRC8 | Payload area |

Bandwidth request message

Bandwidth acknowledge message

Fig. 6
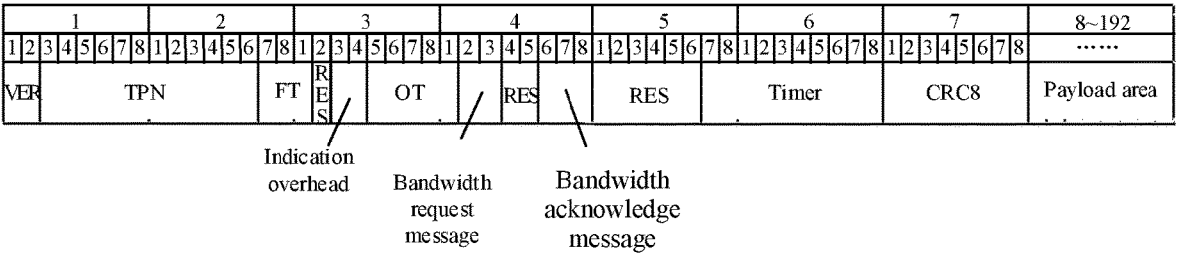
| | 1 | | 2 | | 3 | | 4 | | 5 | | 6 | | 7 | | 8~192 |
|---|---|---|---|---|---|---|---|---|---|---|---|---|---|---|---|
| VER | TPN | FT | RES | OT | RES | RES | Timer | CRC8 | Payload area |
|---|---|---|---|---|---|---|---|---|---|
Indication overhead    Bandwidth request message    Bandwidth acknowledge message
Fig. 7
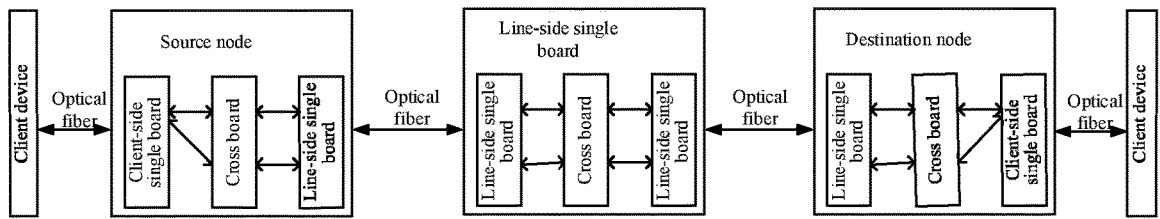
Fig. 8
Interaction module    82

BANDWIDTH ADJUSTMENT METHOD AND APPARATUS, STORAGE MEDIUM, AND ELECTRONIC DEVICE

CROSS REFERENCE TO RELATED APPLICATION

The present disclosure is a National Stage Filing of the PCT International Application No. PCT/CN2022/085907 filed on Apr. 8, 2022, which claims priority to Chinese Patent Application No. 202110595270.1, filed to the China National Intellectual Property Administration on May 28, 2021 and entitled "Bandwidth Adjustment Method and Apparatus, Storage Medium, and Electronic Device", which is incorporated herein by reference in its entirety.

TECHNICAL FIELD

The present disclosure mainly relates to the field of communications, and in particular, to a bandwidth adjustment method and apparatus, a storage medium, and an electronic device.

BACKGROUND

In the definition of existing Optical Transport Network (OTN), a method for loading a plurality of service signals into the payload of an OTN signal is to divide the payload of the OTN signal into n time slots, as shown in FIG. 3, and then to load the service signals into one or more time slots in the payload of the OTN signal, wherein the time slots are achieved by interleaving of bytes.

According to the existing OTN standard G.709, a minimum time slot granularity of the existing OTN technology is 1.25G. When this time slot granularity is used for carrying a service lower than 1.25G, for example, services such as FE, Synchronous Transport Module level-1 (STM-1) and E1, a serious waste in the bandwidth is caused. For example, the size of an E1 signal is 2M, and when this signal is loaded into a time slot of 1.25G, the bandwidth waste can reach 99% or more. Therefore, a transmission technology that enables a method for efficiently carrying small-granularity services in the existing OTN is needed. In the related art, an Optical Service Unit (OSU) is used to carry a small-granularity service, the payload of the OTN frame is divided into Payload Blocks (PBs), as shown in FIG. 4, and the OSU is mapped to the PBs. Before loaded onto an optical port, the OSU needs to be carried in a bundle fiber distribution unit (Oracle Database Unloader, ODU). The rate of the OSU is generally below IG, and one ODU may carry k levels of OSUs. Service end-to-end hitless bandwidth adjustment has always been a strong requirement; and currently, a set of related solutions exist in the industry, but the protocol concerning adjustment still has a certain defect. In order to reduce the bandwidth occupied by a hitless bandwidth adjustment Operation, Administration and Maintenance (OAM) frame, in the current protocol, a bandwidth adjustment request message and a bandwidth adjustment acknowledge message are transmitted in the same OAM frame, as shown in FIG. 5. However, in actual situations, the bandwidth adjustment request message and the bandwidth adjustment acknowledge message are not necessarily transmitted simultaneously.

Regarding the problem in the related art that only a bandwidth adjustment request message and a bandwidth adjustment acknowledge message are transmitted simultaneously in the same OAM frame, no effective technical solution has been proposed.

SUMMARY

Embodiments of the present disclosure provide a bandwidth adjustment method and apparatus, a storage medium, and an electronic device, which may at least solve the problem in the related art that only a bandwidth adjustment request message and a bandwidth adjustment acknowledge message are transmitted simultaneously in the same OAM frame.

Embodiments of the present disclosure provide a bandwidth adjustment method, including: interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message.

According to some other embodiments of the present disclosure, further provided is a bandwidth adjustment apparatus, which is applied to a node in a network and includes: an interaction module, configured to perform interaction of bandwidth adjustment signaling between nodes via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message.

According to still some other embodiments of the present disclosure, further provided is a computer-readable storage medium, the computer-readable storage medium storing a computer program, wherein the computer program is configured to execute, when running, the operations in any one of the method embodiments above.

According to still some other embodiments of the present disclosure, further provided is an electronic device, the electronic device including a memory and a processor: wherein the memory stores a computer program, and the processor is configured to run the computer program to execute the operations in any one of the method embodiments above.

By the technical solutions, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message. By configuring the indication information carried in the hitless bandwidth adjustment OAM frame to instruct each node in a network to send at least one of a bandwidth adjustment request message and a bandwidth adjustment acknowledge message via the hitless bandwidth adjustment OAM frame, the problem in the related art that only a bandwidth adjustment request message and a bandwidth adjustment acknowledge message are transmitted simultaneously in the same OAM frame is solved. By setting the indication information carried in the hitless bandwidth adjustment OAM frame, the hitless bandwidth adjustment OAM frame can transmit either the bandwidth adjustment request message or the bandwidth adjustment acknowledge message, or transmit both the bandwidth adjustment request message and the bandwidth adjustment acknowledge message at the same time.

BRIEF DESCRIPTION OF THE DRAWINGS

The drawings illustrated herein are used for providing further understanding of the present disclosure and constitute a part of some embodiments of the present disclosure, and the exemplary embodiments of the present disclosure and illustrations thereof are used for explaining the present disclosure, rather than constitute inappropriate limitation on the present disclosure. In the drawings:

FIG. 1 is a structural block diagram of hardware of a computer terminal for implementing a bandwidth adjustment method according to embodiments of the present disclosure;

FIG. 2 is a flowchart of a bandwidth adjustment method according to embodiments of the present disclosure:

FIG. 6 is a schematic diagram of a hitless bandwidth adjustment OAM frame carrying indication overheads according to exemplary embodiments of the present disclosure:

FIG. 7 is a schematic diagram of a transmission scenario in which a bandwidth adjustment method is applied according to exemplary embodiments of the present disclosure; and FIG. 8 is a structural block diagram of a bandwidth adjustment apparatus according to embodiments of the present disclosure.

DETAILED DESCRIPTION

Figures 3, 4, 5:
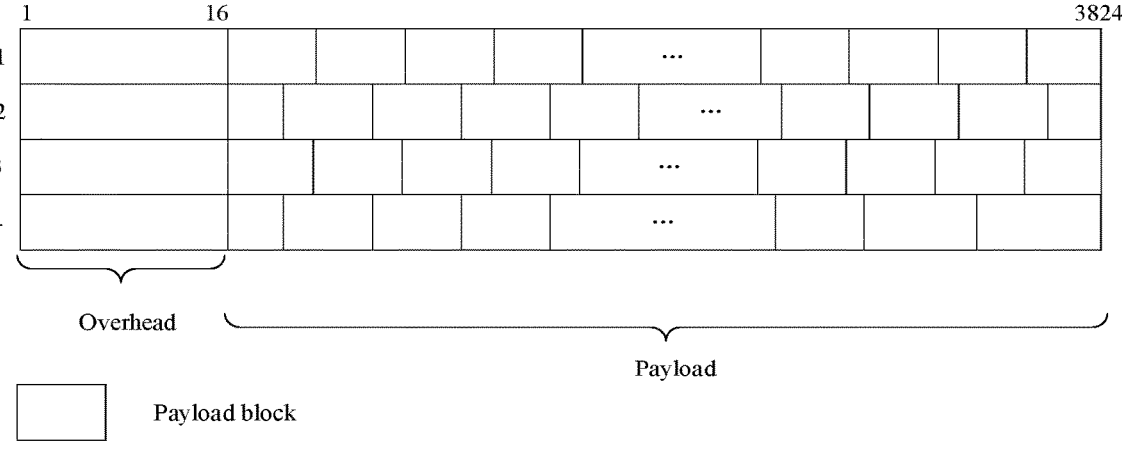
FIG. 3 is a schematic diagram of an OTN frame being divided into time slots in the related art.
FIG. 4 is a schematic diagram of an OTN frame being divided into PBs in the related art.
FIG. 5 is a schematic diagram of an OSU hitless bandwidth adjustment OAM frame in the related art.

Hereinafter, the present disclosure is described in detail with reference to the accompanying drawings and in conjunction with the embodiments. It is to be noted that embodiments in the present disclosure and features in the embodiments may be combined with one another without conflicts.

It is to be noted that the terms "first", "second", etc. in the description, claims and drawings of the present disclosure are used to distinguish similar objects, and are not necessarily used to describe a specific sequence or a precedence order. It should be understood that the data so used may be interchanged where appropriate, so that embodiments of the present disclosure described herein can be implemented in sequences other than those illustrated or described herein. In addition, the terms "include/comprise" and "have" and any variations thereof are intended to cover a non-exclusive inclusion, for example, a process, method, system, product or device that includes a series of operations or units is not necessarily limited to those operations or units that are clearly listed, but may include other operations or units that are not clearly listed or inherent to such process, method, product or device.

The method provided in the embodiments of the present disclosure may be executed in a mobile terminal, a computer terminal or a similar computing apparatus. Taking running the method on a computer terminal as an example, FIG. 1 is a structural block diagram of hardware of a computer terminal for implementing a bandwidth adjustment method according to embodiments of the present disclosure. As shown in FIG. 1, the computer terminal may include one or more (only one shown in FIG. 1) processors 102 (the processors 102 may include, but are not limited to a processing apparatus such as a microprocessor MCU or a programmable logic device FPGA) and a memory 104 configured to store data, In some exemplary implementations, the computer terminal may further include a transmission device 106 and an input/output device 108 for a communication function. A person having ordinary skill in the art would understand that the structure shown in FIG. 1 is merely exemplary, and does not limit the structure of the computer terminal. For example, the computer terminal may also include more or fewer assemblies than those shown in FIG. 1, or have equal functions as those shown in FIG. 1 or different configurations having more functions than those as shown in FIG. 1. The memory 104 may be used for storing a computer program, for example, a software program and module of application software, such as a computer program corresponding to the bandwidth adjustment method in embodiments of the present disclosure. The processor 102 executes various functional applications and data processing by running the computer program stored in the memory 104. i.e. implementing the described method. The memory 104 may include a high-speed random access memory; and may also include a non-transitory memory, such as one or more magnetic storage apparatuses, flash memories or other non-transitory solid-state memories. In some instances, the memory 104 may further include memories remotely arranged with respect to the processor 102, and these remote memories may be connected to the computer terminal via a network. Examples of the network include, but are not limited to the Internet, an intranet, a local area network, a mobile communication network and a combination thereof. The transmission device 106 is configured to receive or send data via a network. Specific examples of the network may include a wireless network provided by a communication provider of the computer terminal. In one example, the transmission device 106 includes a Network Interface Controller (NIC) which may be connected to other network devices by means of a base station, thereby being able to communicate with the Internet. In one example, the transmission device 106 may be a Radio Frequency (RF) module which is configured to communicate with the Internet in a wireless manner.

According to some embodiments of the present disclosure, a bandwidth adjustment method is provided. The method may be applied to the above computer terminal which may be, for example, a standby device. FIG. 2 is a flowchart of a bandwidth adjustment method according to embodiments of the present disclosure. As shown in FIG. 2, the method includes operation S202.

At S202, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the types of the bandwidth adjustment message are used for indicating at least one of a bandwidth adjustment request message and a bandwidth adjustment acknowledge message.

By the technical solutions, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message. By configuring the indication information carried in the hitless bandwidth adjustment OAM frame to instruct each node in a network to send at least one of a bandwidth adjustment request message and a bandwidth adjustment acknowledge message via the hitless bandwidth adjustment OAM frame, the problem in the related art that only a bandwidth adjustment request message and a bandwidth adjustment acknowledge message are transmitted simultaneously in the same OAM frame is solved. By setting the indication information carried in the hitless bandwidth adjustment OAM frame, the type of the bandwidth adjustment message transmitted in the hitless bandwidth adjustment OAM frame may be at least one of the bandwidth adjustment request message and the bandwidth adjustment acknowledge message.

In some exemplary embodiments, the indication information may include: a first indication overhead corresponding to the bandwidth adjustment request message, and a second indication overhead corresponding to the bandwidth adjustment acknowledge message.

It may be understood that a first indication overhead for the bandwidth adjustment request message and a second indication overhead for the bandwidth adjustment acknowledge message are set in the hitless bandwidth adjustment OAM frame, and the indication information is used to indicate a type of which the overhead is valid, wherein the type of the bandwidth adjustment message is used to indicate at least one of a bandwidth adjustment request message and a bandwidth adjustment acknowledge message.

In some exemplary embodiments, in cases where the first indication overhead is valid and the second indication overhead is invalid, it is determined that only the bandwidth adjustment request message is carried in the hitless bandwidth adjustment OAM frame: in cases where the first indication overhead is invalid and the second indication overhead is valid, it is determined that only the bandwidth adjustment acknowledge message is carried in the hitless bandwidth adjustment OAM frame: in cases where the first indication overhead is valid and the second indication overhead is valid, it is determined that the bandwidth adjustment request message and the bandwidth adjustment acknowledge message are carried in the hitless bandwidth adjustment OAM frame.

That is to say, in cases where each node in the network only needs to transmit a bandwidth adjustment request message, the first indication overhead in the hitless bandwidth adjustment OAM frame is set to be valid, and the second indication overhead in the hitless bandwidth adjustment OAM frame is set to be invalid: in cases where each node in the network only needs to transmit a bandwidth adjustment acknowledge message, the first indication overhead in the hitless bandwidth adjustment OAM frame is set to be invalid, and the second indication overhead in the hitless bandwidth adjustment OAM frame is set to be valid: in cases where each node in the network needs to transmit a bandwidth adjustment request message and a bandwidth adjustment acknowledge message, the first indication overhead in the hitless bandwidth adjustment OAM frame is set to be valid, and the second indication overhead in the hitless bandwidth adjustment OAM frame is set to be valid; and in cases where each node in the network does not need to transmit a bandwidth adjustment request message and a bandwidth adjustment acknowledge message, the first indication overhead in the hitless bandwidth adjustment OAM frame is set to be invalid, and the second indication overhead in the hitless bandwidth adjustment OAM frame is set to be invalid. That is, by setting statuses of the indication overheads, the hitless bandwidth adjustment OAM frame can transmit a bandwidth adjustment message of a type corresponding to a valid indication overhead, and then the hitless bandwidth adjustment OAM frame can transmit either the bandwidth adjustment request message or the bandwidth adjustment acknowledge message, or transmit both the bandwidth adjustment request message and the bandwidth adjustment acknowledge message at the same time.

As shown in FIG. 6. FIG. 6 is a schematic diagram of a hitless bandwidth adjustment OAM frame carrying indication overheads according to exemplary embodiments of the present disclosure. When the indication overhead of the bandwidth adjustment request message is valid, it indicates that the hitless bandwidth adjustment OAM frame transmits the bandwidth adjustment request message: when the indication overhead of the bandwidth adjustment acknowledge message is valid, it indicates that the hitless bandwidth adjustment OAM frame transmits the bandwidth adjustment acknowledge message; and when the indication overhead of the bandwidth adjustment request message and the indication overhead of the bandwidth adjustment acknowledge message are both valid, it indicates that the hitless bandwidth adjustment OAM frame transmits the bandwidth adjustment request message and the bandwidth adjustment acknowledge message at the same time.

In some other exemplary embodiments, the indication information includes: a first message status corresponding to the bandwidth adjustment request message and a second message status corresponding to the bandwidth adjustment acknowledge message, wherein the first message status includes a valid status and an invalid status, and the second message status includes a valid status and an invalid status.

According to the above exemplary embodiments, the first message status is set in the bandwidth adjustment request message and the second message status is set in the bandwidth adjustment acknowledge message: that is to say, by setting the message statuses, the type of the bandwidth adjustment message needed to be transmitted in the hitless bandwidth adjustment OAM frame can be determined.

According to the exemplary embodiments, in cases where the bandwidth adjustment request message is in a valid status and the bandwidth adjustment acknowledge message is in an invalid status, it is determined that only the bandwidth adjustment request message is carried in the hitless bandwidth adjustment OAM frame: in cases where the bandwidth adjustment request message is in an invalid status and the bandwidth adjustment acknowledge message is in a valid status, it is determined that only the bandwidth adjustment acknowledge message is carried in the hitless bandwidth adjustment OAM frame: in cases where the bandwidth adjustment request message is in a valid status and the bandwidth adjustment acknowledge message is in a valid status, it is determined that the bandwidth adjustment request message and the bandwidth adjustment acknowledge message are carried in the hitless bandwidth adjustment OAM frame.

In other words, when the message status of the bandwidth adjustment request message is a valid status and the message status of the bandwidth adjustment acknowledge message is an invalid status, it indicates that the hitless bandwidth adjustment OAM frame only transmits the bandwidth adjustment request message: when the message status of the bandwidth adjustment request message is an invalid status and the message status of the bandwidth adjustment acknowledge message is a valid status, it indicates that the hitless bandwidth adjustment OAM frame transmits the bandwidth adjustment acknowledge message: when the message status of the bandwidth adjustment request message is a valid status and the message status of the bandwidth adjustment acknowledge message is a valid status, it indicates that the hitless bandwidth adjustment OAM frame simultaneously transmits the bandwidth adjustment request message and the bandwidth adjustment acknowledge message; and when the message status of the bandwidth adjustment request message is an invalid status and the message status of the bandwidth adjustment acknowledge message is an invalid status, it indicates that the hitless bandwidth adjustment OAM frame does not transmit the bandwidth adjustment request message and the bandwidth adjustment acknowledge message.

In some exemplary embodiments, the operation that the interaction of the bandwidth adjustment signaling between the nodes is performed via the hitless bandwidth adjustment OAM frame includes: for any node in the network, the type carried in the hitless bandwidth adjustment OAM frame is determined; and a bandwidth adjustment process corresponding to the type is executed according to the type.

Each node in the network identifies the type of the bandwidth adjustment message carried in the OAM frame according to indication information in the hitless bandwidth adjustment OAM frame, and executes a corresponding bandwidth adjustment process according to the type of the bandwidth adjustment message, wherein the type of the bandwidth adjustment message is used for indicating at least one of a bandwidth adjustment request message and a bandwidth adjustment acknowledge message. The bandwidth adjustment request message includes a bandwidth increase request message and a bandwidth decrease request message, and the bandwidth adjustment acknowledge message includes a bandwidth increase acknowledge message and a bandwidth decrease acknowledge message.

In some exemplary embodiments, in cases where the node needs to send a bandwidth adjustment message and the node periodically sends the hitless bandwidth adjustment OAM frame, the bandwidth adjustment message needed to be sent is carried in the hitless bandwidth adjustment OAM frame being sent, and the indication information corresponding to the bandwidth adjustment message needed to be sent is set in the hitless bandwidth adjustment OAM frame, wherein the bandwidth adjustment message includes at least one of: a bandwidth adjustment request message and a bandwidth adjustment acknowledge message.

In other words, when the node needs to send a bandwidth adjustment message, it is detected whether the current node is sending a hitless bandwidth adjustment OAM frame or whether the current node sends a hitless bandwidth adjustment OAM frame within a preset time period; and when the current node is sending a hitless bandwidth adjustment OAM frame or the current node sends a hitless bandwidth adjustment OAM frame within a preset time period, the bandwidth adjustment message needed to be sent is carried in the bandwidth adjustment OAM frame being sent and the hitless bandwidth adjustment OAM frame to be sent, and an indication overhead corresponding to the bandwidth adjustment message needed to be sent is set to be valid or a message status corresponding to the bandwidth adjustment message needed to be sent is set to be a valid status.

In some exemplary embodiments, in cases where the node needs to send a bandwidth adjustment message and the node does not periodically send a hitless bandwidth adjustment OAM frame, a first hitless bandwidth adjustment OAM frame is generated and periodically sent, and the bandwidth adjustment message needed to be sent is carried in the first hitless bandwidth adjustment OAM frame; and an indication overhead of a bandwidth adjustment message that needs to be stopped from being sent in the first hitless bandwidth adjustment OAM frame is set to be invalid or a message status of the bandwidth adjustment message that needs to be stopped from being sent in the first hitless bandwidth adjustment OAM frame is set to an invalid status, wherein the bandwidth adjustment message includes at least one of: a bandwidth adjustment request message and a bandwidth adjustment acknowledge message.

In other words, when the node needs to send a bandwidth adjustment message, it is detected whether the current node is sending a hitless bandwidth adjustment OAM frame; and when it is detected that the current node does not periodically send a hitless bandwidth adjustment OAM frame, the current node generates a first hitless bandwidth adjustment OAM frame, periodically sends the hitless bandwidth adjustment OAM frame, carries the bandwidth adjustment message in the first hitless bandwidth adjustment OAM frame, and sets an indication overhead corresponding to the bandwidth adjustment message needed to be sent to be valid or sets a message status corresponding to the bandwidth adjustment message needed to be sent to be a valid status.

In some exemplary embodiments, in cases where the node needs to stop sending a first bandwidth adjustment message and the network node has no second bandwidth adjustment message needed to be sent, the hitless bandwidth adjustment OAM frame is stopped from being sent, wherein the bandwidth adjustment message includes at least one of: a bandwidth adjustment request message and a bandwidth adjustment acknowledge message.

That is to say, when the node has no bandwidth adjustment message needed to be sent, the bandwidth adjustment message is stopped from being sent.

In some exemplary embodiments, in cases where the node needs to stop sending a first bandwidth adjustment message and the network node has a second bandwidth adjustment message needed to be sent, an indication overhead of the first bandwidth adjustment message that needs to be stopped from being sent in the first hitless bandwidth adjustment OAM frame is set to be invalid or a message status of the first bandwidth adjustment message that needs to be stopped from being sent in the first hitless bandwidth adjustment OAM frame is set to an invalid status, wherein the bandwidth adjustment message includes at least one of: a bandwidth adjustment request message and a bandwidth adjustment acknowledge message.

For example, in cases where the node needs to stop sending a bandwidth adjustment request message, it is determined whether the node needs to send a bandwidth adjustment acknowledge message: in cases where the node needs to send a bandwidth adjustment acknowledge message, an indication overhead of the bandwidth adjustment request message is set to be invalid or a message status of the bandwidth adjustment request message is set to be an invalid status, and an indication overhead of the bandwidth adjustment acknowledge message is set to be valid or a message status of the bandwidth adjustment acknowledge message is set to be a valid status, so that the node sends the bandwidth adjustment acknowledge message.

Hereinafter, a flow of the bandwidth adjustment method will be explained and described in combination with several exemplary embodiments, but the exemplary embodiments are not intended to limit the technical solutions of the embodiments of the present disclosure.

Each node in the network periodically sends a hitless bandwidth adjustment OAM frame, wherein the hitless bandwidth adjustment OAM frame includes indication information, the indication information is used for indicating a type of a bandwidth adjustment message transmitted in the hitless bandwidth adjustment OAM frame, the type of the bandwidth adjustment message includes a bandwidth adjustment request message and a bandwidth adjustment acknowledge message, and each hitless bandwidth adjustment OAM frame may transmit one type of bandwidth adjustment message or two types of bandwidth adjustment messages simultaneously.

The indication information may be indication overheads set for the bandwidth adjustment request message and the bandwidth adjustment acknowledge message respectively in the hitless bandwidth adjustment OAM frame. As shown in FIG. 4, when the indication overhead of the bandwidth adjustment request message is valid, it indicates that the hitless bandwidth adjustment OAM frame transmits the bandwidth adjustment request message: when the indication overhead of the bandwidth adjustment acknowledge message is valid, it indicates that the hitless bandwidth adjustment OAM frame transmits the bandwidth adjustment acknowledge message; and when the indication overhead of the bandwidth adjustment request message and the indication overhead of the bandwidth adjustment acknowledge message are both valid, it indicates that the hitless bandwidth adjustment OAM frame transmits the bandwidth adjustment request message and the bandwidth adjustment acknowledge message at the same time.

Another implementation of the indication information is to set an invalid status in the bandwidth adjustment request message and the bandwidth adjustment acknowledge message: when the bandwidth adjustment request message is not in an invalid status and the bandwidth adjustment acknowledge message is in an invalid status, it indicates that the hitless bandwidth adjustment OAM frame transmits the bandwidth adjustment request message: when the bandwidth adjustment request message is in an invalid status and the bandwidth adjustment acknowledge message is not in an invalid status, it indicates that the hitless bandwidth adjustment OAM frame transmits the bandwidth adjustment request message; and when both the bandwidth adjustment request message and the bandwidth adjustment acknowledge message are both not in invalid statuses, it indicates that the hitless bandwidth adjustment OAM frame transmits the bandwidth adjustment request message and the bandwidth adjustment acknowledge message at the same time.

Each node in the network identifies the type of the bandwidth adjustment message carried in the hitless bandwidth adjustment OAM frame according to indication information in the hitless bandwidth adjustment OAM frame, and executes a corresponding bandwidth adjustment process according to the type of the bandwidth adjustment message.

When the node needs to send a bandwidth adjustment message, when it is detected that the node is transmitting a bandwidth adjustment OAM frame, the bandwidth adjustment message needed to be sent is carried in a subsequently sent bandwidth adjustment OAM frame, and a corresponding indication information is set; and when it is detected that the node does not transmit a bandwidth adjustment OAM frame, the bandwidth adjustment message needed to be sent is carried in a bandwidth adjustment OAM frame, a corresponding indication information is set, and the bandwidth adjustment OAM frame is periodically sent.

When the node needs to stop sending a bandwidth adjustment message, when the network element node does not have a bandwidth adjustment message needed to be transmitted, a bandwidth adjustment OAM frame is stopped from being sent; and when the node further needs to transmit another bandwidth adjustment message, an indication overhead of the bandwidth adjustment message requiring to be stopped from being sent in the bandwidth adjustment OAM frame is set to be invalid, or a bandwidth adjustment message requiring to be stopped from being sent in the bandwidth adjustment OAM frame is set to be in an invalid status.

As shown in FIG. 7, FIG. 7 is a schematic diagram of a transmission scenario in which a bandwidth adjustment method is applied according to exemplary embodiments of the present disclosure. In the case of unidirectional hitless bandwidth increase adjustment, each network node in the network executes the following operations.

1) A network administrator node sends a hitless bandwidth increase request message to a source end.

2) The source end periodically and continuously sends, to a destination end, a hitless bandwidth adjustment OAM frame carrying the hitless bandwidth increase request message according to the hitless bandwidth increase request message, sets indication information of the bandwidth increase request message to be valid, and sets indication information of a bandwidth adjustment acknowledge message to be invalid.

3) After receiving the bandwidth adjustment OAM frame carrying the bandwidth increase request message, each intermediate network node performs bandwidth resource checking, determines a size relationship between a bandwidth resource of the current node and the bandwidth in the bandwidth increase request message. When the size relationship indicates that the bandwidth resource of the current node is greater than the bandwidth in the bandwidth increase request message, that is, it is confirmed that the bandwidth resource is sufficient, the intermediate network node continues to send the bandwidth adjustment OAM frame carrying the bandwidth increase request message to a downstream node, i.e. a node in the direction towards destination end. When the size relationship indicates that the bandwidth resource of the current node is less than the bandwidth in the bandwidth increase request message, that is, it is confirmed that the bandwidth resource is insufficient, the current node terminates continuous sending of the bandwidth increase request message, and reports a reason for adjustment failure to the corresponding network administrator.

4) After receiving the bandwidth adjustment OAM frame carrying the bandwidth increase request message, the destination end first adjusts the bandwidth of a client-side interface, adjusts the bandwidth of an OSU, and then sends a bandwidth increase acknowledge message to the source end on a reverse link, and sets indication information of the bandwidth increase request message to be invalid and indication information of the bandwidth increase acknowledge message to be valid, wherein the reverse link refers to a link from the destination end to the source end.

5) In cases where each intermediate network node receives the bandwidth increase acknowledge message on the reverse link and the bandwidth resource is sufficient, the intermediate network node terminates the bandwidth increase acknowledge message, and performs bandwidth adjustment (i.e. PB number adjustment) for the forward link, and after the adjustment, the intermediate network node continues to send the bandwidth increase acknowledge message to an upstream node; and when the adjustment fails, the intermediate network node terminates sending of the bandwidth increase acknowledge message to the upstream node, and reports a reason for adjustment failure to the corresponding network administrator.

6) After receiving the bandwidth increase acknowledge message, the source end performs bandwidth adjustment (i.e. PB number adjustment) for the forward link, adjusts the bandwidth of the OSU, and then adjusts the bandwidth of an client-side interface of the OTN; and when the adjustment fails, the source end stops sending the bandwidth increase request message, and reports a reason for adjustment failure to the corresponding network administrator.

In some exemplary embodiments, in the case of bidirectional hitless bandwidth increase adjustment, each network node in the network executes the following operations.

1) A network administrator sends a bandwidth increase request message to a source end.

2) After confirming that the bandwidth resource is sufficient according to the bandwidth increase request message, the source end detects whether a hitless bandwidth adjustment OAM frame is being transmitted in a direction from the source end to a destination end: when the source end is transmitting a hitless bandwidth adjustment OAM frame, the source end transmits the bandwidth increase request message in a subsequent hitless bandwidth adjustment OAM frame, and sets indication information of the bandwidth increase request message to be valid; and when the source end does not transmit a hitless bandwidth adjustment OAM frame, the source end continuously and periodically sends, to the destination end, a hitless bandwidth adjustment OAM frame carrying the hitless bandwidth increase request message, sets indication information of the bandwidth increase request message to be valid, and sets indication information of a bandwidth increase acknowledge message to be invalid.

3) After receiving the hitless bandwidth adjustment OAM frame, each intermediate node terminates the hitless bandwidth adjustment OAM frame and identifies the bandwidth adjustment message carried in the hitless bandwidth adjustment OAM frame.

For example, when only the bandwidth increase request message is transmitted in the hitless bandwidth adjustment OAM frame, the intermediate node determines a size relationship between a bandwidth resource of the current node and a bandwidth in the bandwidth increase request message. When the size relationship indicates that the bandwidth resource of the current node is greater than the bandwidth in the bandwidth increase request message, that is, it is confirmed that the bandwidth resource is sufficient, the intermediate node continues to send the hitless bandwidth adjustment OAM frame carrying the bandwidth increase request message to a node in the direction towards destination end, sets indication information of the bandwidth increase request message to be valid, and sets indication information of the bandwidth increase acknowledge message to be invalid. When the size relationship indicates that the bandwidth resource of the current node is less than the bandwidth in the bandwidth increase request message, that is, it is confirmed that the bandwidth resource is insufficient, the current node terminates continuous sending of the bandwidth increase request message, and reports a reason for adjustment failure to the corresponding network administrator. Further, when the current node needs to send the bandwidth increase acknowledge message in the direction towards destination end, the current node sets indication information of the bandwidth increase request message in the hitless bandwidth adjustment OAM frame to be invalid; and when the current node does not need to send the bandwidth increase acknowledge message in the direction towards destination end, the current node stops sending the hitless bandwidth adjustment OAM frame.

When only the bandwidth increase acknowledge message is transmitted in the hitless bandwidth adjustment OAM frame, link bandwidth adjustment (i.e. PB number adjustment) in the direction from the destination end to the source end is performed. After the adjustment, the intermediate node continues to send the bandwidth increase acknowledge message to a node in the direction towards destination end, sets indication information of the bandwidth increase request message to be invalid, and sets indication information of the bandwidth increase acknowledge message to be valid. When the adjustment fails, the intermediate network node terminates sending of the bandwidth increase acknowledge message to the direction towards destination end, and reports a reason for adjustment failure to the corresponding network administrator. When the current node needs to send the bandwidth increase request message to the node in the direction towards destination end, indication information of the bandwidth increase acknowledge message in the hitless bandwidth adjustment OAM frame is set to be invalid. When the bandwidth increase request message does not need to be sent in the direction towards destination end, the sending of the hitless bandwidth adjustment OAM frame is stopped.

When the bandwidth increase request message and the bandwidth increase acknowledge message are transmitted simultaneously in the hitless bandwidth adjustment OAM frame, the intermediate node determines a size relationship between a bandwidth resource of the current node and a bandwidth in the bandwidth increase request message. When the size relationship indicates that the bandwidth resource of the current node is greater than the bandwidth in the bandwidth increase request message, that is, it is confirmed that the bandwidth resource is sufficient, the intermediate node continues to send the hitless bandwidth adjustment OAM frame carrying the bandwidth increase request message to a node in the direction towards destination end, sets indication information of the bandwidth increase request message to be valid, and sets indication information of the bandwidth increase acknowledge message to be invalid. When the size relationship indicates that the bandwidth resource of the current node is less than the bandwidth in the bandwidth increase request message, that is, it is confirmed that the bandwidth resource is insufficient, the current node terminates continuous sending of the bandwidth increase request message, reports a reason for adjustment failure to the corresponding network administrator, and performs link bandwidth adjustment (i.e. PB number adjustment) in the direction from the destination end to the source end. After the adjustment, the intermediate node continues to send the bandwidth increase acknowledge message to a node in the direction towards destination end, sets indication information of the bandwidth increase request message to be invalid, and sets indication information of the bandwidth increase acknowledge message to be valid. When it is necessary to simultaneously transmit the bandwidth increase request message and the bandwidth increase acknowledge message, these two messages are transmitted in the same hitless bandwidth adjustment OAM frame, and indication information of the bandwidth increase request message and the bandwidth increase acknowledge message is set to be valid. When after processing, only the bandwidth increase request message needs to be transmitted, indication information corresponding to the bandwidth increase request message is set to be valid, and the indication information of the bandwidth increase acknowledge message is set to be invalid. When after processing, only the bandwidth increase acknowledge message needs to be transmitted, indication information corresponding to the bandwidth increase acknowledge message is set to be valid, and indication information of the bandwidth increase request message is set to be invalid.

4) After receiving the hitless bandwidth adjustment OAM frame, the destination end identifies a bandwidth adjustment message carried in the hitless bandwidth adjustment OAM frame.

When only the bandwidth increase request message is transmitted in the hitless bandwidth adjustment OAM frame, the bandwidth of a client-side interface is first adjusted, and it is detected whether a hitless bandwidth adjustment OAM frame is being transmitted in a path in the direction from the destination end to the source end. When a hitless bandwidth adjustment OAM frame is being transmitted in a path in the direction from the destination end to the source end, a bandwidth acknowledge message is transmitted in the hitless bandwidth adjustment OAM frame, and indication information of the bandwidth increase request message is set to be valid. When there is no hitless bandwidth adjustment OAM frame being transmitted in a path in the direction from the destination end to the source end, the destination end continuously and periodically sends, to the source end, a next hitless bandwidth adjustment OAM frame carrying a bandwidth increase acknowledge message, sets indication information of the bandwidth increase acknowledge message to be valid, and sets indication information of the bandwidth increase request message to be invalid.

When only the bandwidth increase acknowledge message is transmitted in the hitless bandwidth adjustment OAM frame, link bandwidth adjustment. i.e. PB number adjustment, in the direction from the destination end to the source end is performed, the bandwidth of the OSU is adjusted, and then the bandwidth of a client-side interface of the OTN is adjusted. When the adjustment fails, the bandwidth increase request message is stopped from being sent to the source end, and a reason for adjustment failure is reported to the corresponding network administrator.

When the bandwidth increase request message and the bandwidth increase acknowledge message are transmitted simultaneously in the hitless bandwidth adjustment OAM frame, the bandwidth of the client-side interface is firstly adjusted, and the hitless bandwidth adjustment OAM frame carrying the bandwidth increase acknowledge message is sent in the direction towards source end, and link bandwidth adjustment. i.e. PB number adjustment, is performed in the direction from the destination end to the source end: the bandwidth of the OSU is adjusted, and then the bandwidth of an client-side interface of the OTN is adjusted.

5) After receiving the hitless bandwidth adjustment OAM frame, the source end identifies the bandwidth adjustment message carried in the hitless bandwidth adjustment OAM frame.

When only the bandwidth increase acknowledge message is transmitted in the bandwidth adjustment OAM frame, link bandwidth adjustment (i.e. PB number adjustment) in the direction from the source end to the destination end is performed: the bandwidth of the OSU is adjusted, and then the bandwidth of a client-side interface of the OTN is adjusted. When the adjustment fails, the bandwidth increase request message is stopped from being sent to the destination end (when it is necessary to send the bandwidth increase acknowledge message to the direction towards destination end, the bandwidth increase request message in the hitless bandwidth adjustment OAM frame is set to be invalid; and when it is not necessary to send the bandwidth increase acknowledge message in the direction towards destination end, the hitless bandwidth adjustment OAM frame is stopped from being sent), and a reason for adjustment failure is reported to the corresponding network administrator.

When only the bandwidth increase request message is transmitted in the hitless bandwidth adjustment OAM frame, the bandwidth of the client-side interface is first adjusted, and then it is detected whether a hitless bandwidth adjustment OAM frame is being transmitted in a path in the direction from the source end to the destination end. When a hitless bandwidth adjustment OAM frame is being transmitted in a path in the direction from the source end to the destination end, a bandwidth acknowledge message is transmitted in the hitless bandwidth adjustment OAM frame being sent, and indication information of the bandwidth increase acknowledge message is set to be valid. When there is no hitless bandwidth adjustment OAM frame being transmitted in the path in the direction from the source end to the destination end, the source end continuously and periodically sends, to the destination end, a hitless bandwidth adjustment OAM frame carrying the bandwidth increase acknowledge message, and sets indication information of the bandwidth increase acknowledge message to be valid, and indication information of the bandwidth increase request message to be invalid.

When the bandwidth increase request message and the bandwidth increase acknowledge message are transmitted simultaneously in the hitless bandwidth adjustment OAM frame, the source end performs link bandwidth adjustment (i.e. PB number adjustment) in a direction from the source end to the destination end according to the bandwidth increase request message, adjusts the bandwidth of the OSU, adjusts the bandwidth of an client-side interface of the OTN, then adjusts the bandwidth of the client-side interface according to the bandwidth increase acknowledge message, and sends a hitless bandwidth adjustment OAM frame carrying the bandwidth increase acknowledge message to the destination end.

In some exemplary embodiments, in the case of unidirectional hitless bandwidth decrease adjustment, each network node in the network executes the following operations.

1) A network administrator sends a bandwidth decrease request message to a source end.

2) The source end firstly adjusts the bandwidth of a client-side interface to a target bandwidth, and performs bandwidth adjustment (i.e. PB number adjustment), then periodically sends the bandwidth decrease request message to a destination end, and sets indication information of the bandwidth decrease request message to be valid, and sets indication information of a bandwidth decrease acknowledge message to be invalid, wherein the target bandwidth is a bandwidth indicated in the bandwidth decrease adjustment request.

3) After receiving the bandwidth decrease request message, each intermediate node performs bandwidth adjustment (PB number adjustment), and after completing the adjustment of the current node, the current node continues to send the bandwidth decrease request message to a node in the direction towards destination end. When the adjustment fails, the current node stops sending the bandwidth decrease request message, and reports a reason for adjustment failure to the corresponding network administrator.

4) After receiving the bandwidth decrease request message, the destination end performs link bandwidth adjustment (PB number adjustment), then adjusts the bandwidth of the client-side interface, then sends a bandwidth decrease acknowledge message to the source end in a reverse direction, and sets indication information of the bandwidth decrease request message to be invalid, and sets indication information of the bandwidth decrease acknowledge message to be valid.

5) The intermediate node transmits the bandwidth decrease acknowledge message.

6) After receiving the bandwidth decrease acknowledge message, the source end stops sending the bandwidth decrease request message, and then reports an adjustment completion acknowledgement message to the network administrator.

7) After the destination end no longer receives the bandwidth decrease request message, the destination end stops sending the bandwidth decrease acknowledge message.

8) After the adjustment is completed, all network nodes actively report changes of OSU bandwidth and link resources to the network administrator, wherein all the nodes include intermediate nodes, the destination end and the source end.

In some exemplary embodiments, in the case of bidirectional hitless bandwidth decrease adjustment, each network node in the network executes the following operations.

1) A network administrator sends a bandwidth decrease adjustment request to a source end.

2) The source end firstly adjusts the bandwidth of a client-side interface to a target bandwidth according to the bandwidth decrease adjustment request, wherein the target bandwidth is a bandwidth indicated in the bandwidth decrease adjustment request, performs link bandwidth adjustment (PB number adjustment) in a direction from the source end to a destination end, then detects whether a hitless bandwidth adjustment OAM frame is being transmitted in the direction from the source end to the destination end. When the source end is transmitting a hitless bandwidth adjustment OAM frame in the direction from the source end to the destination end, the bandwidth decrease request message is transmitted in the hitless bandwidth adjustment OAM frame being transmitted, and indication information of the bandwidth decrease request message is set to be valid. When the source end does not transmit a hitless bandwidth adjustment OAM frame in the direction from the source end to the destination end, the source end continuously and periodically sends, to the destination end, a hitless bandwidth adjustment OAM frame carrying the hitless bandwidth decrease request message, sets indication information of the bandwidth decrease request message to be valid, and sets indication information of a bandwidth decrease acknowledge message to be invalid.

3) Each intermediate node receives the hitless bandwidth adjustment OAM frame and identifies the bandwidth adjustment message carried in the OAM frame.

For example, when only the bandwidth decrease request message is transmitted in the hitless bandwidth adjustment OAM frame, link bandwidth adjustment (PB number adjustment) is performed in the direction from the source end to the destination end, and after completing the bandwidth adjustment, the current node continues to send the bandwidth decrease request message to the node in the direction towards destination end. When the adjustment fails, the current node stops sending the bandwidth decrease request message to the node in the direction towards destination end. When a bandwidth decrease acknowledge message needs to be sent in the direction towards destination end, the bandwidth decrease request message in the hitless bandwidth adjustment OAM frame is set to be invalid. When it is not necessary to send a bandwidth decrease acknowledge message in the direction towards destination end, the hitless bandwidth adjustment OAM frame is stopped from being sent, and a reason for adjustment failure is reported to the corresponding network administrator.

When only the bandwidth decrease acknowledge message is transmitted in the hitless bandwidth adjustment OAM frame, the bandwidth decrease acknowledge message continues to be transmitted in the direction towards destination end.

When the bandwidth decrease request message and the bandwidth decrease acknowledge message are transmitted simultaneously in the hitless bandwidth adjustment OAM frame, link bandwidth adjustment (PB number adjustment) is performed in a direction from the source end to the destination end according to the bandwidth decrease request message; and the bandwidth decrease acknowledge message continues to be transmitted in the direction towards destination end according to the bandwidth decrease acknowledge message. When the current node needs to simultaneously transmit the bandwidth decrease request message and the bandwidth decrease acknowledge message in the direction towards destination end, these two messages are transmitted in the same hitless bandwidth adjustment OAM frame, and indication information of the bandwidth decrease request message and the bandwidth decrease acknowledge message is set to be valid. When after processing, only the bandwidth decrease acknowledge message needs to be transmitted, indication information corresponding to the bandwidth decrease acknowledge message is set to be valid, and indication information of the bandwidth decrease request message is set to be invalid.

4) After receiving the hitless bandwidth adjustment OAM frame, the destination end identifies a bandwidth adjustment message carried in the OAM frame.

In some exemplary implementations, when only the bandwidth decrease request message is transmitted in the hitless bandwidth adjustment OAM frame, the bandwidth of a client-side interface is adjusted, and it is detected whether a hitless bandwidth adjustment OAM frame is being transmitted in a path in the direction from the destination end to the source end. When a hitless bandwidth adjustment OAM frame is being transmitted in the path in the direction from the destination end to the source end, a bandwidth acknowledge message is transmitted in the hitless bandwidth adjustment OAM frame, and indication information of the bandwidth decrease acknowledge message is set to be valid.

When a hitless bandwidth adjustment OAM frame is not being transmitted in the path in the direction from the destination end to the source end, a next hitless bandwidth adjustment OAM frame carrying the bandwidth decrease acknowledge message is continuously and periodically sent in the direction towards source end, indication information of the bandwidth decrease acknowledge message is set to be valid, and indication information of the bandwidth decrease request message is set to be invalid.

When only the bandwidth decrease acknowledge message is transmitted in the hitless bandwidth adjustment OAM frame, the bandwidth decrease request message is stopped from being sent in the direction towards source end (when the bandwidth decrease acknowledge message needs to be sent in the direction towards source end, the bandwidth decrease request message in the hitless bandwidth adjustment OAM frame is set to be invalid; and when the bandwidth decrease acknowledge message does not need to be sent in the direction towards source end, the hitless bandwidth adjustment OAM frame is stopped from being sent), and then an adjustment completion acknowledgement message is reported to the network administrator.

When the bandwidth decrease request message and the bandwidth decrease acknowledge message are transmitted simultaneously in the hitless bandwidth adjustment OAM frame, the bandwidth of the client-side interface is adjusted according to the bandwidth decrease request message, the hitless bandwidth adjustment OAM frame carrying the bandwidth decrease acknowledge message is transmitted to the source end: the bandwidth decrease request message is stopped from being sent in the direction towards source end according to the bandwidth decrease acknowledge message, and then an adjustment completion acknowledgement message is reported to the network administrator.

5) After receiving the hitless bandwidth adjustment OAM frame, the source end identifies a bandwidth adjustment message carried in the OAM frame.

When only the bandwidth decrease acknowledge message is transmitted in the hitless bandwidth adjustment OAM frame, the bandwidth decrease request message is stopped from being sent in the direction towards destination end, and then an adjustment completion acknowledgement message is reported to the network administrator.

When only the bandwidth decrease request message is transmitted in the hitless bandwidth adjustment OAM frame, the bandwidth of the client-side interface is adjusted, and it is detected whether a hitless bandwidth adjustment OAM frame is being transmitted in a path in the direction from the source end to the destination end. When a hitless bandwidth adjustment OAM frame is being transmitted in the path in the direction from the source end to the destination end, a bandwidth acknowledge message is transmitted in the hitless bandwidth adjustment OAM frame, and indication information of the bandwidth decrease acknowledge message is set to be valid. When a hitless bandwidth adjustment OAM frame is not being transmitted in a path in the direction from the source end to the destination end, a next hitless bandwidth adjustment OAM frame carrying the bandwidth decrease acknowledge message is continuously and periodically sent in the direction towards source end, indication information of the bandwidth decrease acknowledge message is set to be valid, and indication information of the bandwidth decrease request message is set to be invalid.

When the bandwidth decrease request message and the bandwidth decrease acknowledge message are transmitted simultaneously in the hitless bandwidth adjustment OAM frame, the bandwidth decrease request message is stopped from being sent in the direction towards destination end according to the bandwidth decrease acknowledge message; and then an adjustment completion acknowledgement message is reported to the network administrator, the bandwidth of the client-side interface is adjusted according to the bandwidth decrease request message, and the hitless bandwidth adjustment OAM frame carrying the bandwidth decrease acknowledge message is sent to the destination end.

By the technical solutions, each node in the network sends a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the types of the bandwidth adjustment message are used for indicating at least one of a bandwidth adjustment request message and a bandwidth adjustment acknowledge message. By configuring the indication information carried in the hitless bandwidth adjustment OAM frame to instruct each node in the network to send at least one of a bandwidth adjustment request message and a bandwidth adjustment acknowledge message via the hitless bandwidth adjustment OAM frame, the problem in the related art that only a bandwidth adjustment request message and a bandwidth adjustment acknowledge message are transmitted simultaneously in the same OAM frame is solved. By setting the indication information carried in the hitless bandwidth adjustment OAM frame, the hitless bandwidth adjustment OAM frame can transmit either the bandwidth adjustment request message or the bandwidth adjustment acknowledge message, or transmit both the bandwidth adjustment request message and the bandwidth adjustment acknowledge message at the same time.

From the description of the embodiments above, a person having ordinary skill in the art would have been able to clearly understand that the method in the embodiments above may be implemented by using software and necessary general hardware platforms, and of course may also be implemented using hardware, but in many cases, the former is a better embodiment. On the basis of such understanding, the essence portion of the technical solutions of the present disclosure or the portion of the technical solutions of the present disclosure that contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to execute the methods as described in various embodiments of the present disclosure.

The embodiments of the present disclosure further provide a bandwidth adjustment apparatus, the apparatus is configured to implement the described embodiments and exemplary embodiments, and what has been described will not be repeated again. As used below: the term "module" may implement a combination of software and/or hardware of predetermined functions. Although the apparatus described in the following embodiments is preferably implemented in software, implementation in hardware or a combination of software and hardware is also possible and could have been conceived.

FIG. 8 is a structural block diagram of a bandwidth adjustment apparatus according to embodiments of the present disclosure. As shown in FIG. 8, the apparatus includes:

an interaction module 82, configured to perform interaction of bandwidth adjustment signaling between nodes via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message.

By the technical solutions, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message. By configuring the indication information carried in the hitless bandwidth adjustment OAM frame to instruct each node in the network to send at least one of a bandwidth adjustment request message and a bandwidth adjustment acknowledge message via the hitless bandwidth adjustment OAM frame, the problem in the related art that only a bandwidth adjustment request message and a bandwidth adjustment acknowledge message are transmitted simultaneously in the same OAM frame is solved. By setting the indication information carried in the hitless bandwidth adjustment OAM frame, the hitless bandwidth adjustment OAM frame can transmit either the bandwidth adjustment request message or the bandwidth adjustment acknowledge message, or transmit both the bandwidth adjustment request message and the bandwidth adjustment acknowledge message at the same time.

In some exemplary embodiments, the indication information includes: a first indication overhead corresponding to the bandwidth adjustment request message, and a second indication overhead corresponding to the bandwidth adjustment acknowledge message.

It may be understood that in the hitless bandwidth adjustment OAM frame, the first indication overhead is set for the bandwidth adjustment request message and the second indication overhead is set for the bandwidth adjustment acknowledge message, respectively, the indication information is used to indicate a type of which the overhead is valid, wherein the type of the bandwidth adjustment message is used to indicate at least one of a bandwidth adjustment request message and a bandwidth adjustment acknowledge message.

In some exemplary embodiments, the apparatus further includes: a determination module, configured to determine that only the bandwidth adjustment request message is carried in the hitless bandwidth adjustment OAM frame, in cases where the first indication overhead is valid and the second indication overhead is invalid: determine that only the bandwidth adjustment acknowledge message is carried in the hitless bandwidth adjustment OAM frame, in cases where the first indication overhead is invalid and the second indication overhead is valid: determine that the bandwidth adjustment request message and the bandwidth adjustment acknowledge message are carried in the hitless bandwidth adjustment OAM frame, in cases where the first indication overhead is valid and the second indication overhead is valid.

That is to say, in cases where each node in the network only needs to transmit the bandwidth adjustment request message, the first indication overhead in the hitless bandwidth adjustment OAM frame is set to be valid, and the second indication overhead in the hitless bandwidth adjustment OAM frame is set to be invalid: in cases where each node in the network only needs to transmit a bandwidth adjustment acknowledge message, the first indication overhead in the hitless bandwidth adjustment OAM frame is set to be invalid, and the second indication overhead in the hitless bandwidth adjustment OAM frame is set to be valid: in cases where each node in the network needs to transmit a bandwidth adjustment request message and a bandwidth adjustment acknowledge message, the first indication overhead in the hitless bandwidth adjustment OAM frame is set to be valid, and the second indication overhead in the hitless bandwidth adjustment OAM frame is set to be valid; and in cases where each node in the network does not need to transmit a bandwidth adjustment request message and a bandwidth adjustment acknowledge message, the first indication overhead in the hitless bandwidth adjustment OAM frame is set to be invalid, and the second indication overhead in the hitless bandwidth adjustment OAM frame is set to be invalid. That is, by setting statuses of the indication overheads, the hitless bandwidth adjustment OAM frame can transmit a bandwidth adjustment message of a type corresponding to a valid indication overhead, and then the hitless bandwidth adjustment OAM frame can transmit either the bandwidth adjustment request message or the bandwidth adjustment acknowledge message, or transmit both the bandwidth adjustment request message and the bandwidth adjustment acknowledge message at the same time.

As shown in FIG. 6. FIG. 6 is a schematic diagram of a hitless bandwidth adjustment OAM frame carrying indication overheads according to exemplary embodiments of the present disclosure. When the indication overhead of the bandwidth adjustment request message is valid, it indicates that the hitless bandwidth adjustment OAM frame transmits the bandwidth adjustment request message: when the indication overhead of the bandwidth adjustment acknowledge message is valid, it indicates that the hitless bandwidth adjustment OAM frame transmits the bandwidth adjustment acknowledge message; and when the indication overhead of the bandwidth adjustment request message and the indication overhead of the bandwidth adjustment acknowledge message are both valid, it indicates that the hitless bandwidth adjustment OAM frame transmits the bandwidth adjustment request message and the bandwidth adjustment acknowledge message at the same time.

In some other exemplary embodiments, the indication information includes: a first message status corresponding to the bandwidth adjustment request message and a second message status corresponding to the bandwidth adjustment acknowledge message, wherein the first message status includes a valid status and an invalid status, and the second message status includes a valid status and an invalid status.

That is, the first message status is set in the bandwidth adjustment request message and the second message status is set in the bandwidth adjustment acknowledge message: that is to say, by setting the message statuses, the type of the bandwidth adjustment message needed to be transmitted in the hitless bandwidth adjustment OAM frame can be determined.

In some exemplary embodiments, the determination module is further configured to: determine that only the bandwidth adjustment request message is carried in the hitless bandwidth adjustment OAM frame, in cases where the bandwidth adjustment request message is in a valid status and the bandwidth adjustment acknowledge message is in an invalid status; determine that only the bandwidth adjustment acknowledge message is carried in the hitless bandwidth adjustment OAM frame, in cases where the bandwidth adjustment request message is in an invalid status and the bandwidth adjustment acknowledge message is in a valid status: determine that the bandwidth adjustment request message and the bandwidth adjustment acknowledge message are carried in the hitless bandwidth adjustment OAM frame, in cases where the bandwidth adjustment request message is in a valid status and the bandwidth adjustment acknowledge message is in a valid status.

In other words, when the message status of the bandwidth adjustment request message is a valid status and the message status of the bandwidth adjustment acknowledge message is an invalid status, it indicates that the hitless bandwidth adjustment OAM frame only transmits the bandwidth adjustment request message: when the message status of the bandwidth adjustment request message is an invalid status and the message status of the bandwidth adjustment acknowledge message is a valid status, it indicates that the hitless bandwidth adjustment OAM frame transmits the bandwidth adjustment acknowledge message: when the message status of the bandwidth adjustment request message is a valid status and the message status of the bandwidth adjustment acknowledge message is a valid status, it indicates that the hitless bandwidth adjustment OAM frame simultaneously transmits the bandwidth adjustment request message and the bandwidth adjustment acknowledge message; and when the message status of the bandwidth adjustment request message is an invalid status and the message status of the bandwidth adjustment acknowledge message is an invalid status, it indicates that the hitless bandwidth adjustment OAM frame does not transmit the bandwidth adjustment request message and the bandwidth adjustment acknowledge message.

In some exemplary embodiments, the determination module is further configured to: determine, for any node in the network, types of the bandwidth adjustment messages carried in the hitless bandwidth adjustment OAM frame; and execute a bandwidth adjustment process corresponding to the type according to the type.

Each node in the network identifies the type of the bandwidth adjustment message carried in the OAM frame according to indication information in the hitless bandwidth adjustment OAM frame, and executes a corresponding bandwidth adjustment process according to the type of the bandwidth adjustment message, wherein the type of the bandwidth adjustment message is used for indicating at least one of a bandwidth adjustment request message and a bandwidth adjustment acknowledge message. The bandwidth adjustment request message includes a bandwidth increase request message and a bandwidth decrease request message, and the bandwidth adjustment acknowledge message includes a bandwidth increase acknowledge message and a bandwidth decrease acknowledge message.

In some exemplary embodiments, the determination module is further configured to: carry the bandwidth adjustment message needed to be sent in the hitless bandwidth adjustment OAM frame being sent in cases where the node needs to send a bandwidth adjustment message and the node periodically sends the hitless bandwidth adjustment OAM frame, and set the indication information corresponding to the bandwidth adjustment message needed to be sent in the hitless bandwidth adjustment OAM frame, wherein the bandwidth adjustment message includes at least one of: a bandwidth adjustment request message and a bandwidth adjustment acknowledge message.

In other words, when the node needs to send a bandwidth adjustment message, it is detected whether the current node is sending a hitless bandwidth adjustment OAM frame or whether the current node sends a hitless bandwidth adjustment OAM frame within a preset time period; and when the current node is sending a hitless bandwidth adjustment OAM frame or the current node sends a hitless bandwidth adjustment OAM frame within a preset time period, the bandwidth adjustment message needed to be sent is carried in the bandwidth adjustment OAM frame being sent and the hitless bandwidth adjustment OAM frame to be sent, and an indication overhead corresponding to the bandwidth adjustment message needed to be sent is set to be valid or a message status corresponding to the bandwidth adjustment message needed to be sent is set to be a valid status.

In some exemplary embodiments, the determination module is further configured to: generate and periodically send a first hitless bandwidth adjustment OAM frame and carry the bandwidth adjustment message needed to be sent in the first hitless bandwidth adjustment OAM frame, in cases where the node needs to send a bandwidth adjustment message and the node does not periodically send a hitless bandwidth adjustment OAM frame; and set an indication overhead of a bandwidth adjustment message that needs to be stopped from being sent in the first hitless bandwidth adjustment OAM frame to be invalid or set a message status of the bandwidth adjustment message that needs to be stopped from being sent in the first hitless bandwidth adjustment OAM frame to an invalid status, wherein the bandwidth adjustment message includes at least one of: a bandwidth adjustment request message and a bandwidth adjustment acknowledge message.

In other words, when the node needs to send a bandwidth adjustment message, it is detected whether the current node is sending a hitless bandwidth adjustment OAM frame; and when it is detected that the current node does not periodically send a hitless bandwidth adjustment OAM frame, the current node generates a first hitless bandwidth adjustment OAM frame, periodically sends the hitless bandwidth adjustment OAM frame, carries the bandwidth adjustment message in the first hitless bandwidth adjustment OAM frame, and sets an indication overhead corresponding to the bandwidth adjustment message needed to be sent to be valid or sets a message status corresponding to the bandwidth adjustment message needed to be sent to be a valid status.

In some exemplary embodiments, an instruction module is further configured to stop sending the first hitless bandwidth adjustment OAM frame in cases where the node needs to stop sending a first bandwidth adjustment message and the node has no second bandwidth adjustment message needed to be sent, wherein the bandwidth adjustment message includes at least one of: a bandwidth adjustment request message and a bandwidth adjustment acknowledge message.

That is to say, when the node has no bandwidth adjustment message needed to be sent, the bandwidth adjustment message is stopped from being sent.

In some exemplary embodiments, the instruction module is further configured to set an indication overhead of the first bandwidth adjustment message that needs to be stopped from being sent in the first hitless bandwidth adjustment OAM frame to be invalid or set a message status of the first bandwidth adjustment message that needs to be stopped from being sent in the first hitless bandwidth adjustment OAM frame to an invalid status, in cases where the network node in each node needs to stop sending a first bandwidth adjustment message and the network node has a second bandwidth adjustment message needed to be sent, wherein the bandwidth adjustment message includes at least one of: a bandwidth adjustment request message and a bandwidth adjustment acknowledge message.

For example, in cases where the node needs to stop sending a bandwidth adjustment request message, it is determined whether the node needs to send a bandwidth adjustment acknowledge message: in cases where the node needs to send a bandwidth adjustment acknowledge message, an indication overhead of the bandwidth adjustment request message is set to be invalid or a message status of the bandwidth adjustment request message is set to be an invalid status, and an indication overhead of the bandwidth adjustment acknowledge message is set to be valid or a message status of the bandwidth adjustment acknowledge message is set to be a valid status, so that the node sends the bandwidth adjustment acknowledge message.

It should be noted that the described modules may be implemented by software or hardware. The latter may be implemented in the following manner, but is not limited thereto: all the modules are located in the same processor: or all the modules are located in different processors in any arbitrary combination manner.

The embodiments of the present disclosure further provide a storage medium, the computer-readable storage medium stores a computer program, wherein the computer program is configured to execute, when running, the operations in any one of the method embodiments above.

In some exemplary implementations of this embodiment, the computer-readable storage medium may be configured to store a computer program for executing the following operation S12.

At S12, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message.

In some exemplary implementations of this embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic device, including a memory and a processor: wherein the memory stores a computer program, and the processor is configured to run the computer program to execute the operations in any one of the method embodiments above.

In some exemplary implementations, the electronic device may further include a transmission device and an input/output device, wherein the transmission device is connected to the processor, and the input/output device is connected to the processor.

In some exemplary implementations of the present embodiment, the processor may be configured to execute the following operation S22 when running the computer program.

At S22, interaction of bandwidth adjustment signaling between nodes is performed via a hitless bandwidth adjustment OAM frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message includes: a bandwidth adjustment request message and a bandwidth adjustment acknowledge message.

In some exemplary implementations of the present embodiment, the computer-readable storage medium may include, but is not limited to, any medium that can store program codes, such as a USB flash drive, a Read-Only Memory (ROM), a Random Access Memory (RAM), a removable hard disk, a magnetic disk, or an optical disc.

For specific examples in the present embodiment, reference can be made to the examples described in the embodiments above and exemplary embodiments, and thus they will not be repeated again in the present embodiment.

It is apparent that a person having ordinary skill in the art shall understand that all of the modules or operations in the present disclosure may be implemented by using a general computing apparatus, may be centralized on a single computing apparatus or may be distributed on a network composed of multiple computing apparatuses. In some exemplary implementations, they may be implemented by using executable program codes of the computing apparatus. Thus, they may be stored in a storage apparatus and executed by the computing apparatus, and in some cases, the shown or described operations may be executed in a sequence different from that shown herein, or they are manufactured into integrated circuit modules, or multiple modules or operations therein are manufactured into a single integrated circuit module. Thus, the present disclosure is not limited to any specific hardware and software combinations.

The content above merely relates to exemplary embodiments of the present disclosure, and is not intended to limit the present disclosure. For a person having ordinary skill in the art, the present disclosure may have various modifications and changes. Any modifications, equivalent replacements, improvements, etc. made within the principle of the present disclosure shall all fall within the scope of protection of the present disclosure.

What is claimed is:

1. A bandwidth adjustment method, comprising:
    performing interaction of bandwidth adjustment signaling between nodes via a hitless bandwidth adjustment Operation, Administration and Maintenance (OAM) frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message comprises: a bandwidth adjustment request message and a bandwidth adjustment acknowledge message, wherein the indication information comprises: a first message status corresponding to the bandwidth adjustment request message and a second message status corresponding to the bandwidth adjustment acknowledge message, wherein the first message status comprises a valid status and an invalid status, and the second message status comprises a valid status and an invalid status.

2. The method according to claim 1, wherein the indication information comprises: a first indication overhead corresponding to the bandwidth adjustment request message, and a second indication overhead corresponding to the bandwidth adjustment acknowledge message.

3. The method according to claim 2, further comprising:
    determining that only the bandwidth adjustment request message is carried in the hitless bandwidth adjustment OAM frame, in a case where the first indication overhead is valid and the second indication overhead is invalid;

determining that only the bandwidth adjustment acknowledge message is carried in the hitless bandwidth adjustment OAM frame, in a case where the first indication overhead is invalid and the second indication overhead is valid;

determining that the bandwidth adjustment request message and the bandwidth adjustment acknowledge message are carried in the hitless bandwidth adjustment OAM frame, in a case where the first indication overhead is valid and the second indication overhead is valid.

4. The method according to claim 1, further comprising:

determining that only the bandwidth adjustment request message is carried in the hitless bandwidth adjustment OAM frame, in a case where the bandwidth adjustment request message is in a valid status and the bandwidth adjustment acknowledge message is in an invalid status;

determining that only the bandwidth adjustment acknowledge message is carried in the hitless bandwidth adjustment OAM frame, in a case where the bandwidth adjustment request message is in an invalid status and the bandwidth adjustment acknowledge message is in a valid status;

determining that the bandwidth adjustment request message and the bandwidth adjustment acknowledge message are carried in the hitless bandwidth adjustment OAM frame, in a case where the bandwidth adjustment request message is in a valid status and the bandwidth adjustment acknowledge message is in a valid status.

5. The method according to claim 1, wherein performing the interaction of the bandwidth adjustment signaling between the nodes via the hitless bandwidth adjustment OAM frame comprises:

for any node in the network, determining the type carried in the hitless bandwidth adjustment OAM frame; and executing a bandwidth adjustment process according to the type.

6. The method according to claim 1, further comprising:

in a case where a node needs to send a bandwidth adjustment message and the node periodically sends the hitless bandwidth adjustment OAM frame, carrying the bandwidth adjustment message needed to be sent in the hitless bandwidth adjustment OAM frame, and setting the indication information corresponding to the bandwidth adjustment message needed to be sent in the hitless bandwidth adjustment OAM frame, wherein the bandwidth adjustment message comprises at least one of: a bandwidth adjustment request message and a bandwidth adjustment acknowledge message.

7. The method according to claim 1, further comprising:

in a case where a node needs to send a bandwidth adjustment message and the node does not periodically send a hitless bandwidth adjustment OAM frame, generating and periodically sending a first hitless bandwidth adjustment OAM frame, carrying the bandwidth adjustment message needed to be sent in the first hitless bandwidth adjustment OAM frame, and setting an indication overhead of a bandwidth adjustment message that needs to be stopped from being sent in the first hitless bandwidth adjustment OAM frame to be invalid or setting a message status of the bandwidth adjustment message that needs to be stopped from being sent in the first hitless bandwidth adjustment OAM frame to an invalid status, wherein the bandwidth adjustment message comprises at least one of: a bandwidth adjustment request message and a bandwidth adjustment acknowledge message.

8. The method according to claim 1, further comprising:

in a case where a node needs to stop sending a first bandwidth adjustment message and the node has a second bandwidth adjustment message needed to be sent, setting an indication overhead of the first bandwidth adjustment message that needs to be stopped from being sent in the first hitless bandwidth adjustment OAM frame to be invalid or setting a message status of the first bandwidth adjustment message that needs to be stopped from being sent in the first hitless bandwidth adjustment OAM frame to an invalid status, wherein the bandwidth adjustment message comprises at least one of: a bandwidth adjustment request message and a bandwidth adjustment acknowledge message.

9. A non-transitory computer-readable storage medium, the computer-readable storage medium storing a computer program, wherein the computer program is configured to execute the following operations when running:

performing interaction of bandwidth adjustment signaling between nodes via a hitless bandwidth adjustment Operation, Administration and Maintenance (OAM) frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message comprises: a bandwidth adjustment request message and a bandwidth adjustment acknowledge message, wherein the indication information comprises: a first message status corresponding to the bandwidth adjustment request message and a second message status corresponding to the bandwidth adjustment acknowledge message, wherein the first message status comprises a valid status and an invalid status, and the second message status comprises a valid status and an invalid status.

10. An electronic device, comprising a memory and a processor, wherein the memory stores a computer program, and the processor is configured to run the computer program so as to execute the following operations:

performing interaction of bandwidth adjustment signaling between nodes via a hitless bandwidth adjustment Operation, Administration and Maintenance (OAM) frame, wherein the hitless bandwidth adjustment OAM frame carries indication information, the indication information is used for indicating a type of a bandwidth adjustment message transmitted in the hitless bandwidth adjustment OAM frame, and the type of the bandwidth adjustment message comprises: a bandwidth adjustment request message and a bandwidth adjustment acknowledge message, wherein the indication information comprises: a first message status corresponding to the bandwidth adjustment request message and a second message status corresponding to the bandwidth adjustment acknowledge message, wherein the first message status comprises a valid status and an invalid status, and the second message status comprises a valid status and an invalid status.

11. The method according to claim 1, wherein the bandwidth adjustment request message comprises a bandwidth increase request message or a bandwidth decrease request message; and the bandwidth adjustment acknowledge message comprises a bandwidth increase acknowledge message or a bandwidth decrease acknowledge message.

12. The method according to claim 1, further comprising:

in a case where a node needs to stop sending a first bandwidth adjustment message and the node has no second bandwidth adjustment message needed to be sent, stopping sending the hitless bandwidth adjustment OAM frame, wherein the bandwidth adjustment message comprises at least one of: a bandwidth adjustment request message and a bandwidth adjustment acknowledge message.

13. The electronic device according to claim 10, wherein the indication information comprises: a first indication overhead corresponding to the bandwidth adjustment request message, and a second indication overhead corresponding to the bandwidth adjustment acknowledge message.

14. The electronic device according to claim 13, wherein the processor is configured to run the computer program so as to further execute the following operations:

determining that only the bandwidth adjustment request message is carried in the hitless bandwidth adjustment OAM frame, in a case where the first indication overhead is valid and the second indication overhead is invalid;

determining that only the bandwidth adjustment acknowledge message is carried in the hitless bandwidth adjustment OAM frame, in a case where the first indication overhead is invalid and the second indication overhead is valid;

determining that the bandwidth adjustment request message and the bandwidth adjustment acknowledge message are carried in the hitless bandwidth adjustment OAM frame, in a case where the first indication overhead is valid and the second indication overhead is valid.

15. The electronic device according to claim 10, wherein the processor is configured to run the computer program so as to further execute the following operations:

determining that only the bandwidth adjustment request message is carried in the hitless bandwidth adjustment OAM frame, in a case where the bandwidth adjustment request message is in a valid status and the bandwidth adjustment acknowledge message is in an invalid status;

determining that only the bandwidth adjustment acknowledge message is carried in the hitless bandwidth adjustment OAM frame, in a case where the bandwidth adjustment request message is in an invalid status and the bandwidth adjustment acknowledge message is in a valid status;

determining that the bandwidth adjustment request message and the bandwidth adjustment acknowledge message are carried in the hitless bandwidth adjustment OAM frame, in a case where the bandwidth adjustment request message is in a valid status and the bandwidth adjustment acknowledge message is in a valid status.

16. The electronic device according to claim 10, wherein performing the interaction of the bandwidth adjustment signaling between the nodes via the hitless bandwidth adjustment OAM frame comprises:

for any node in the network, determining the type carried in the hitless bandwidth adjustment OAM frame; and executing a bandwidth adjustment process corresponding to the type.

17. The electronic device according to claim 10, wherein the processor is configured to run the computer program so as to further execute the following operations:

in a case where a node needs to send a bandwidth adjustment message and the node periodically sends the hitless bandwidth adjustment OAM frame, carrying the bandwidth adjustment message needed to be sent in the hitless bandwidth adjustment OAM frame, and setting the indication information corresponding to the bandwidth adjustment message needed to be sent in the hitless bandwidth adjustment OAM frame, wherein the bandwidth adjustment message comprises at least one of: a bandwidth adjustment request message and a bandwidth adjustment acknowledge message.

18. The electronic device according to claim 10, wherein the processor is configured to run the computer program so as to further execute the following operations:

in a case where a node needs to send a bandwidth adjustment message and the node does not periodically send a hitless bandwidth adjustment OAM frame, generating and periodically sending a first hitless bandwidth adjustment OAM frame, carrying the bandwidth adjustment message needed to be sent in the first hitless bandwidth adjustment OAM frame, and setting an indication overhead of a bandwidth adjustment message that needs to be stopped from being sent in the first hitless bandwidth adjustment OAM frame to be invalid or setting a message status of the bandwidth adjustment message that needs to be stopped from being sent in the first hitless bandwidth adjustment OAM frame to an invalid status, wherein the bandwidth adjustment message comprises at least one of: a bandwidth adjustment request message and a bandwidth adjustment acknowledge message.

* * * * *